US010804717B1

(12) United States Patent
Gaide et al.

(10) Patent No.: US 10,804,717 B1
(45) Date of Patent: Oct. 13, 2020

(54) RESETTABLE BATTERY DISCONNECT DEVICE

(71) Applicant: AMAZON TECHNOLOGIES, INC., Seattle, WA (US)

(72) Inventors: Benjamin Thomas Gaide, San Jose, CA (US); Bryan Holmdahl, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 402 days.

(21) Appl. No.: 15/832,487

(22) Filed: Dec. 5, 2017

(51) Int. Cl.
*H02J 7/00* (2006.01)

(52) U.S. Cl.
CPC .......... *H02J 7/0031* (2013.01); *H02J 7/0068* (2013.01); *H02J 7/0077* (2013.01)

(58) Field of Classification Search
CPC ....... H02J 7/0031; H02J 7/0077; H02J 7/0068
USPC ...................................... 320/112; 361/1–138
See application file for complete search history.

(56) References Cited

U.S. PATENT DOCUMENTS

| 6,075,345 | A  | * | 6/2000  | Lee ..................... | H02J 7/0068  |
|           |    |   |         |                          | 320/138      |
| 6,369,696 | B2 | * | 4/2002  | Curran .................. | G08B 7/06    |
|           |    |   |         |                          | 315/241 S    |
| 7,830,252 | B2 | * | 11/2010 | Keeney .................. | G08B 5/38    |
|           |    |   |         |                          | 340/540      |
| 2005/0156574 | A1 | * | 7/2005 | Sato ...................... | H02J 7/0029 |
|           |    |   |         |                          | 320/134      |
| 2009/0208821 | A1 | * | 8/2009 | Kosugi ................. | B60L 58/30  |
|           |    |   |         |                          | 429/61       |

* cited by examiner

*Primary Examiner* — Richard V Muralidar
(74) *Attorney, Agent, or Firm* — Lindauer Law, PLLC

(57) ABSTRACT

A resettable battery input control apparatus includes disconnect circuitry that allows for a battery or other power source to be disconnected from a load in an electronic device. A processor, such as a power management integrated circuit, may assess operating data indicative of operation of the electronic device. If the processor determines a fault condition, the disconnect circuitry is activated. In the event that the processor itself fails, the disconnect circuitry will fail safe and disconnect the battery from the load. Once disconnected, the battery remains disconnected until external power is applied. In one implementation the disconnect circuitry may comprise a field-effect transistor acting as a low-side switch that operates to disconnect the negative terminal of the battery from the load.

20 Claims, 5 Drawing Sheets

RESETTABLE BATTERY DISCONNECT DEVICE

BACKGROUND

Battery powered devices range from weather stations that acquire environmental data to consumer electronic devices to vehicles, and more. Safe operation of these devices is desired to prevent injury to users, harm to the surrounding environment, damage to the devices themselves, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
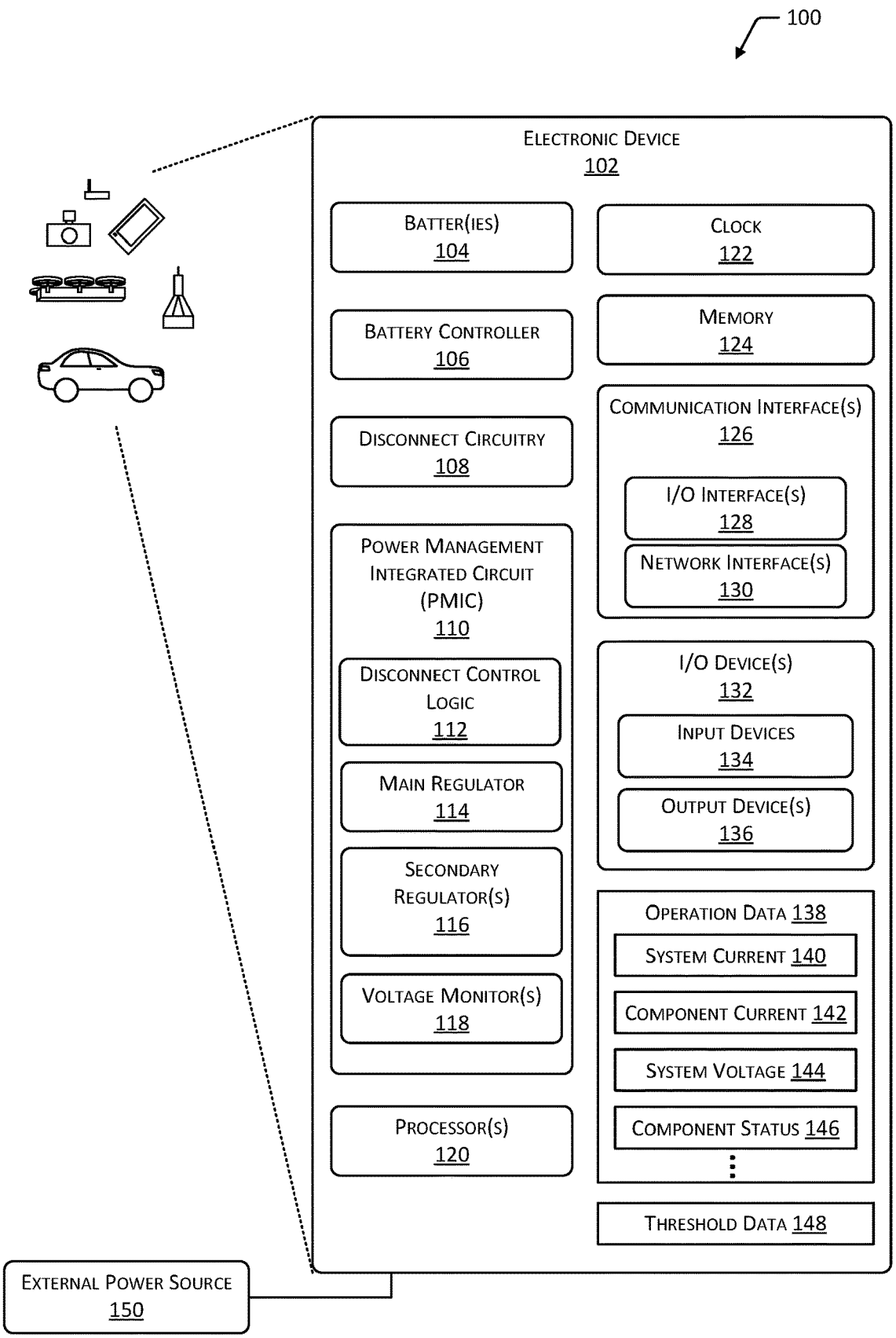
FIG. 1 depicts an electronic device that utilizes a battery or other power source and includes disconnect circuitry to disconnect the power source in the event an actual or suspected fault is detected, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

The structures depicted in the following figures are not necessarily according to scale. Furthermore, the proportionality of one component to another may change with different implementations. In some illustrations the scale or a proportionate size of one structure may be exaggerated with respect to another to facilitate illustration, and not necessarily as a limitation.

DETAILED DESCRIPTION

Electronic devices may be powered by a variety of power sources. For example, power sources may include batteries, fuel cells, photovoltaic cells, wireless power receivers, generators, and so forth. The power source may be internal to the electronic device (device) or may be external to the device.

A device, or the components therein, may experience faults for many reasons. For example, a component in the device may overheat, the electrical power drawn by the components of the device may exceed that available from the power source resulting in a "brownout", and so forth. The ability to disconnect the power source from the electrical load (load) in the device in the event of a fault provides many advantages. For example, disconnection may prevent damage to the power source, to components in the load, or both. One technique to disconnect the load from the power source is a thermal fuse that provides a fusible link. If the current drawn through the fusible link exceeds a threshold value, the temperature of the fusible link increases until the fusible link is destroyed, opening the circuit and disconnecting the power source from the load.

Thermal fuses have several operating limitations. One limitation is that while the fuse between the power source and the load is typically sized to allow for the transfer of a peak current, lesser currents may still cause faults. For example, a particular component in the device may be damaged due to a current that, while excessive for that component, is less than the peak current. As a result, the thermal fuse would not operate in this situation to disconnect the power source from the load. Another limitation is that a thermal fuse may exhibit a relatively long time to operate, increasing the damage associated with a fault. Yet another limitation is that a thermal fuse may require replacement to restore operation.

One way to protect a load is by using a low side switch. The use of a low side switch to disconnect the load from the battery provides several benefits including reduced cost, improved reliability, and improved power efficiency. However, low side switching results in changes to a device's ground reference when the device is in different configurations, such as having the battery connected, having the battery disconnected, when an external power source or load is connected such as with a universal serial bus (USB) port, and so forth. Because of these changes in ground reference, communication between such a switch and other components may be impaired. For example, other techniques to disconnect the battery may result in the grounds being pulled up to the device's positive voltage. This removes the potential for a voltage difference, producing a situation in which there is no potential difference and thus data cannot be communicated. Furthermore, many semiconductor devices utilize diodes on their input and output terminals to protect against electrostatic discharge (ESD) damage. These diodes may thus act to block a common line between the battery and the system, preventing that common line from going below the ground voltage of the device. As a result, communication via this pathway is also precluded. Various systems to provide communication between a component to disconnect the battery and other components may thus add significant complexity, cost, and may adversely impact overall reliability.

Described in this disclosure is disconnect circuitry that may be used to disconnect a power source, such as a battery, from a load. The disconnect circuitry may be used to disconnect the power source from the load by a power management integrated circuit (PMIC). The disconnect circuitry is designed to fail safe, in that failure of the PMIC will result in the disconnect circuitry operating to disconnect the power source from the load.

The power source provides a positive supply terminal and a negative supply terminal. For example, the power source may comprise a battery with a positive battery terminal and a negative battery terminal. The battery may be a non-rechargeable (primary) battery or a rechargeable (secondary) battery. In one implementation, the disconnect circuitry may comprise a first field-effect transistor (FET). For example, the first FET may comprise an N-type enhancement mode power. A first source terminal of the first FET is connected to the negative supply terminal. A first gate terminal of the first FET is connected to an input terminal. The input terminal may be designated as "BatOff_H". The first gate terminal of the first FET is also connected to the positive supply terminal via a first resistor. A first drain of the first FET is connected to a second gate of a second FET. For example, the second FET may comprise a discharge control FET that is typically connected to a discharge control terminal of a battery controller. The second source of the second FET is also connected to the negative supply terminal.

During a non-fault condition, the input terminal provides a low impedance pathway to ground such that a first voltage at the first gate of the first FET (as measured between the first gate and the first source) is kept below a first gate threshold. As a result, the first FET is in an "off" state, and does not provide a path for appreciable current flow between the first drain and the first source. For example, the input terminal may be connected to a general purpose input/output (GPIO) pin on a power management integrated circuit (PMIC). In the non-fault condition, the GPIO pin pulls the first voltage down below the first gate threshold.

During a fault condition, the input terminal may provide a high impedance pathway to ground. For example, the GPIO pin on the PMIC may be released, producing a high impedance path. The high impedance of the input terminal impedes current flow, resulting in an increase of voltage at the first gate of the first FET. In another example, the GPIO pin on the PMIC may be configured to provide a low impedance pathway to the positive battery terminal. In either instance, the voltage present at the first gate exceeds the first gate threshold, transitioning the first FET into an "on" state in which current flows between the first drain and the first source. When the first FET is in the on state, a conductive path is provided between the second gate and the second source of the second FET. As a result, a second voltage difference between the second gate and the second source drops below a second gate threshold of the second FET. This transitions the second FET into an "off" state, preventing current flow between the second drain of the second FET and the second source of the second FET, thus disconnecting the power source from the load.

With this configuration of disconnect circuitry, the power source is not able to reconnect the power source to the load without external power. To reconnect the power source to the load, a second power source is connected to the load side of the circuit. This second power source provides electrical power to operate the disconnect circuitry as well as other circuitry, such as the PMIC, a battery controller, and so forth. As power is applied to the load side, devices such as the PMIC and battery controller begin to operate. If no fault is determined to be present, the disconnect circuitry operates to reconnect the battery to the load. However, if a fault is still present, the disconnect circuitry will operate as described above.

Once the disconnect circuitry has operated to disconnect the power source from the load, the load may be reconnected to the power source by applying external or supplemental power. For example, the disconnect circuitry is installed in a mobile electronic device such as a tablet computer. After determining a fault, the PMIC may operate to activate the disconnect circuitry to disconnect the battery from the load. By disconnecting the battery from the load, the device is now in a safe condition in which further damage or potential damage is avoided. An external power source may be connected to the tablet computer, resulting in the disconnect circuitry operating to reconnect the battery to the load. Should another fault be determined, the PMIC may again operate to activate the disconnect circuitry to disconnect the battery from the load.

The disconnect circuitry described herein is inexpensive, with one implementation utilizing a single field effect transistor (FET) and two resistors. The disconnect circuitry improves the safety of a device by providing a fail-safe disconnection of the power source from the load if a fault is determined. The disconnect circuitry is analog and operates independently of other devices, such as a battery controller. As a result, addition of the disconnect circuitry may not result in additional requirements for regulatory or safety qualifications. To further decrease cost and improve integration, the disconnect circuitry may be incorporated into other devices or packages, such as the PMIC, the battery controller, and so forth.

As described above, the PMIC may be configured to control the first voltage present on the first gate, thus controlling operation of the disconnect circuitry. The PMIC may include a processor or microcontroller that uses disconnect control logic to assess operation data indicative of operation of the device or components of the device. The operation data may comprise information such as current consumption, voltage, count of heartbeat signals, and so forth. If the operation data indicates a fault condition exists, the PMIC may operate to raise the first voltage above the first gate threshold, resulting in the disconnection of the battery from the load.

In other implementations, the disconnect circuitry may be used in other ways. For example, a battery pack that includes a battery controller and the disconnect circuitry may be "turned off" using the disconnect circuitry prior to shipment, prior to installation, and so forth. This prevents the battery pack from presenting energized terminals, improving safety. Additionally, this reduces the effects of inrush current that may otherwise occur when an energized battery pack is connected to the load.

The circuitry and techniques described herein improve the safety of electronic devices. Situations that could result in harm may be avoided, reducing the potential for personal injury, property damage, and so forth.

Illustrative System

FIG. 1 depicts a system 100 that includes an electronic device 102. The electronic device 102 may comprise a mobile electronic device, stationary electronic device, portable electronic device, and so forth. For example, the electronic device 102 may include a portable weather station, a home security camera, a tablet computer, a camera, an autonomous vehicle, a vehicle, and so forth.

The electronic device 102 includes one or more power sources that provide electrical energy. The power sources may include one or more of batteries 104, fuel cells, photovoltaic cells, thermocouples, wireless power receivers, generators, and so forth. The batteries 104 may be non-rechargeable (primary) batteries, rechargeable (secondary) batteries, and so forth. For example, the batteries 104 may comprise rechargeable lithium ion batteries, lithium polymer batteries, nickel metal hydride batteries, and so forth.

The electronic device 102 may comprise a battery controller 106. The battery controller 106 may be designed to control the charge and discharge of a rechargeable battery. The battery controller 106 may utilize non-digital circuitry to protect one or more cells from overcharging, overdischarge, overcurrent, and so forth. For example, the battery 104 may comprise a single cell lithium polymer battery and the battery controller 106 may comprise the S-8211C series battery protection integrated circuit (IC) from SII Semiconductor Corporation. In other examples, other battery controllers 106 may be used.

The electronic device 102 includes disconnect circuitry 108. The disconnect circuitry 108 is designed to controllably disconnect the battery 104, or other power source, from the load of the electronic device 102. The disconnect circuitry 108 is fail-safe in several respects. The disconnect may be triggered by an affirmative action by a controlling device, such as a power management integrated circuit (PMIC) 110. For example, if the PMIC determines that a fault condition exists, the PMIC may release a pin that is connected to the disconnect circuitry 108, resulting in the disconnect taking place. In the event the PMIC fails to operate, such as if the PMIC is experiencing a brownout, the disconnect circuitry 108 will activate, disconnecting the battery 104 from the load.

The PMIC 110 may include a microprocessor, microcontroller, or other programmable control circuitry that is able to perform disconnect control logic 112. The disconnect control logic 112 assesses operation data about the electronic device 102 and determines if a fault condition exists. If a fault condition exists, the PMIC 110 may activate the disconnect circuitry 108 to disconnect the battery 104 from the load. The operation data and the disconnect control logic 112 are discussed in more detail below.

The PMIC 110 may include, or may operate in conjunction with, one or more of a main regulator 114 or one or more secondary regulator(s) 116. The main regulator 114 may comprise a linear voltage regulator that regulates output voltage to a specific rail. The secondary regulator(s) 116 may comprise a linear voltage regulator that regulates output voltage to other rails. One or more of the main regulator 114 or secondary regulator(s) 116 may be configured to operate even when the supply voltage, such as provided from the battery 104, is close to the desired output voltage. For example, the main regulator 114 and the secondary regulator(s) 116 may comprise a low-dropout (LDO) regulator.

The PMIC 110 may also include, or may operate in conjunction with, one or more voltage monitors 118. The voltage monitors 118 may be used to provide information about the voltage differential between different components of the electronic device 102, or within the components of the electronic device 102.

The electronic device 102 may include one or more hardware processors 120 (processors) configured to execute one or more stored instructions. The processors 120 may comprise one or more cores. The processors 120 may include general purpose microprocessors, graphic processing units, microcontrollers, application specific integrated circuits (ASICs), digital signal processors (DSPs), and so forth. One or more clocks 122 may provide information indicative of date, time, ticks, and so forth.

The electronic device 102 includes one or more memories 124. The memory 124 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 124 provides storage of computer-readable instructions, data structures, program modules, and other data for the operation of the electronic device 102. Functional modules may be stored in the memory 124, although the same functionality may alternatively be implemented in hardware, firmware, as a system on a chip (SoC), and so forth. For example, the memory 124 may include at least one operating system (OS) module that is configured to manage operation of components, provide various services to applications or modules executing on the processors 120, and so forth.

The electronic device 102 may include one or more communication interfaces 126 such as input/output (I/O) interfaces 128, network interfaces 130, and so forth. The communication interfaces 126 enable the electronic device 102, or components thereof, to communicate with other devices or components. The communication interfaces 126 may include one or more I/O interfaces 128. The I/O interfaces 128 may comprise Inter-Integrated Circuit (I2C), Serial Peripheral Interface bus (SPI), Universal Serial Bus (USB), RS-232, and so forth.

The I/O interface(s) 128 may couple to one or more I/O devices 132. The I/O devices 132 may include input devices 134. The input devices 134 may include but are not limited to, the touch sensors, microphones, cameras, inertial measurement units (IMU), and so forth. The I/O devices 132 may include output devices 136. The output devices 136 may include but are not limited to displays, speakers, haptic output devices, and so forth. The output devices 136 are configured to generate signals, which may be perceived by the user or may be detected by input devices 134. In some embodiments, the I/O devices 132 may be physically incorporated with the electronic device 102 or may be externally placed.

The network interfaces 130 may be configured to provide communications between the electronic device 102 and other devices, such as a server. The network interfaces 130 may include devices configured to couple to personal area networks (PANs), wired or wireless local area networks (LANs), wide area networks (WANs), and so forth. For example, the network interfaces 130 may include devices compatible with Ethernet, Wi-Fi, Bluetooth, Bluetooth Low Energy, ZigBee, and so forth.

The electronic device 102 may also include one or more busses or other internal communications hardware or software that allow for the transfer of data between the various modules and components of the electronic device 102.

The electrical load of the electronic device 102 may include one or more of the PMIC 110, the processors 120, the clock 122, the memory 124, the communication interfaces 126, the I/O devices 132, and so forth.

During operation of the device, the PMIC 110 or other components may generate operation data 138. The operation data 138 comprises information indicative of operation of one or more components of the electronic device 102. For example, the operation data 138 may include system current 140 data, component current 142 data, system voltage 144 data indicative of voltage across supply rails, component status 146 data, temperature data, and so forth. The PMIC 110 may use the disconnect control logic 112 to compare the operation data 138 to threshold data 148. The threshold data 148 may specify minima, maxima, ranges, and so forth, that are associated with normal operation of the components. For example, the threshold data 148 may specify a range of acceptable voltage as measured across a main bus of the electronic device 102. In another example, the threshold data 148 may specify a maximum current draw for particular components. Based on the comparison, the PMIC 110 may determine that a fault condition is present and subsequently operate the disconnect circuitry 108 to disconnect the battery 104 or other power source from the load.

The disconnect control logic 112 may be used to monitor the system current 140 that is indicative of total current draw of the load at a particular time or over a particular period of time. For example, the system current 140 may indicate a current draw of 1.7 amps. The disconnect control logic 112 may be used to compare the system current 140 with threshold data 148 indicative of a maximum permitted current value. Continuing the example, the maximum permitted current value may be 1.0 amp. In this example, the system current value of 1.7 amps exceeds the maximum permitted current value, and the disconnect circuitry 108 may be activated to disconnect the load from the battery 104.

The disconnect control logic 112 may be used to monitor the component current 142 that is indicative of current draw of particular components in the load. For example, the component current 142 may indicate the display is drawing 2.1 amps. The disconnect control logic 112 may be used to compare the component current 142 with threshold data 148 indicative of a maximum permitted display current value. Continuing the example, the maximum permitted display current value may be 1.5 amps. In this example, the component current value of 2.1 amps exceeds the maximum permitted display current value, and the disconnect circuitry 108 may be activated to disconnect the load from the battery 104.

The disconnect control logic 112 may be used to monitor the system voltage 144 that is indicative of voltage at particular points of the load. For example, the system voltage 144 may monitor a voltage at the main supply rail. The disconnect control logic 112 may be used to compare the system voltage 144 with threshold data 148 indicative of an acceptable voltage range that is defined by a minimum voltage value and a maximum voltage value. For example, the minimum voltage value may be 2.9 V and the maximum voltage value may be 3.4 V. Continuing the example, a system voltage 144 value of 2.7 V is outside of the acceptable voltage range, and the disconnect circuitry 108 may be activated to disconnect the load from the battery 104.

The disconnect control logic 112 may utilize component status 146 to determine if the disconnect circuitry 108 is to be activated to disconnect the load from the battery 104. The component status 146 provides information about one or more of the components currently being utilized, level of utilization, actual duration of utilization, and so forth. The component status 146 may be acquired by the processor 120 that indicates the expected power consumption characteristics of one or more of the particular components or the entire load. The processor 120 may then provide this information to the PMIC 110. For example, the OS module may gather the component status 146 and send this via an I2C I/O interface 128 to the PM IC 110. This component status 146 may indicate that the processor 120 is running at maximum clock speed, the display is currently active and set at full brightness, the network interface 130 is active and transmitting data, and so forth.

By using the component status 146, the disconnect control logic 112 of the PMIC 110 is able to respond to the dynamic operation of the electronic device 102. Continuing the example above, based on the component status 146 indicating that many of the components are active, the maximum permitted current value may be set to 7 amps. In comparison, when the component status 146 indicates that most of the components are off or in a sleep or standby mode, the maximum permitted current value may be set to 0.3 amps.

The operation data 138 may include other data as well, such as a count of received heartbeat signals, data indicative of whether the device is in the process of rebooting, current fault counter, system reset count, data indicative of a previous activation of the disconnect circuitry 108, and so forth. For example, the current fault counter may maintain a count that is indicative of a current fault condition that has previously been determined. The disconnect control logic 112 may activate the disconnect circuitry 108 when a current heartbeat count is less than a threshold value and a current fault counter is greater than a threshold value.

In some implementations the heartbeat signal may be a response to a poll signal. For example, the PM IC 110 may poll components such as the processor 120. During normal operation, the processor 120, responsive to the poll signal, may return a heartbeat signal. In the event of a failure, the processor 120 may be unresponsive to the poll signal.

In other implementations other operation data 138 or threshold data 148 may be used by the disconnect control logic 112. For example, the operation data 138 may be indicative of a maximum power consumption by a particular component. The threshold data 148 may specify a maximum permitted power dissipation for a particular time for that particular component. For example, the threshold data 148 may specify that the processor 120 may be allowed to dissipate 28 watts for no more than 5 seconds to avoid damage. Based on the threshold data 148, if the disconnect control logic 112 indicates that the total power dissipation has exceeded this threshold, then the disconnect circuitry 108 may be activated to disconnect the load, including the processor 120, from the battery 104.

In some implementations the battery controller 106 may provide at least a portion of the operation data 138. For example, the battery controller 106 may comprise digital circuitry that provides information about status of one or more cells within a battery pack. The PMIC 110 may use this operation data 138 to determine if a fault condition exists, and if so, to operate the disconnect circuitry 108 as described herein. For example, the battery controller 106 may output operation data 138 indicative of an overdischarge fault. Based on this operation data 138, the disconnect control logic 112 may activate the disconnect circuitry 108.

The disconnect circuitry 108 also prevents the battery 104 from being reconnected to the load without external power. To restore the connection between the battery 104 and the load, an external power source 150 or other supplementary power source is used to provide power to the system, resetting the disconnect circuitry 108 into the "on" state. For example, if the electronic device 102 is a security camera, detection of a fault condition results in the disconnect circuitry 108 disconnecting the battery 104 from the load. If the security camera is subsequently connected to external power, such as provided by a universal serial bus (USB) cable, the disconnect circuitry 108 restores the connection between the battery 104 and the load.

The disconnect circuitry 108 may be used in situations other than a fault condition. For example, a battery pack with an integrated battery controller 106 and disconnect circuitry 108 may be "turned off" using the disconnect circuitry 108 prior to shipment, prior to installation, and so forth. This prevents the battery pack from presenting energized terminals, improving safety. Additionally, this reduces the effects of inrush current that may otherwise occur when an energized battery pack is connected to the load.

Figure 2:
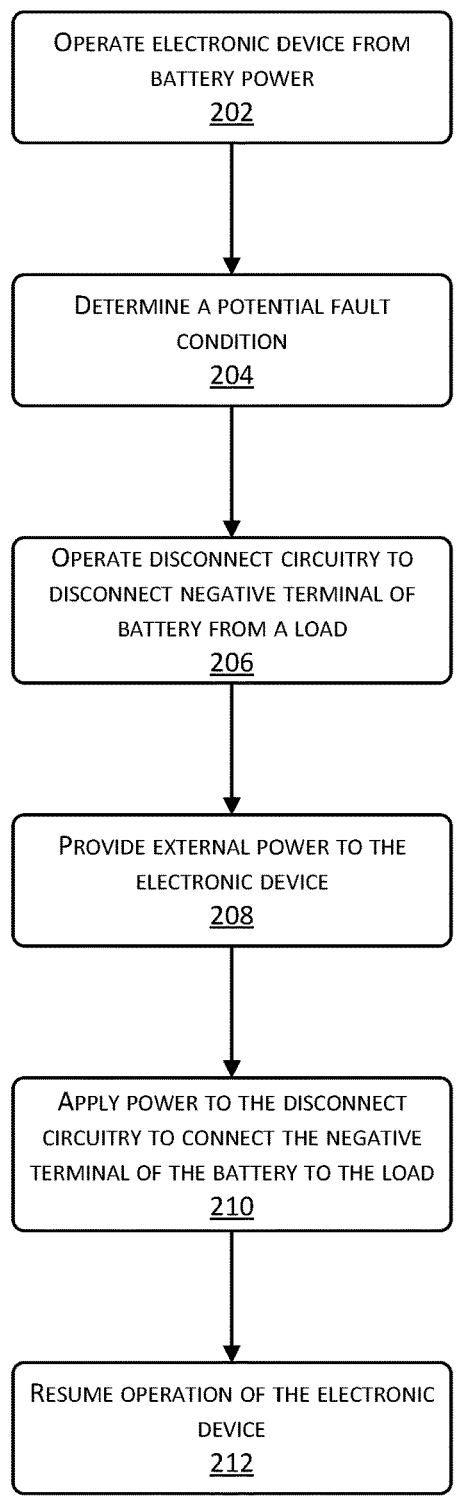
FIG. 2 illustrates a scenario in which a fault in the electronic device has been detected, the disconnect circuitry has disconnected the battery from the load in the electronic device, and operation is subsequently restored using external power, according to some implementations.
Figure 2:
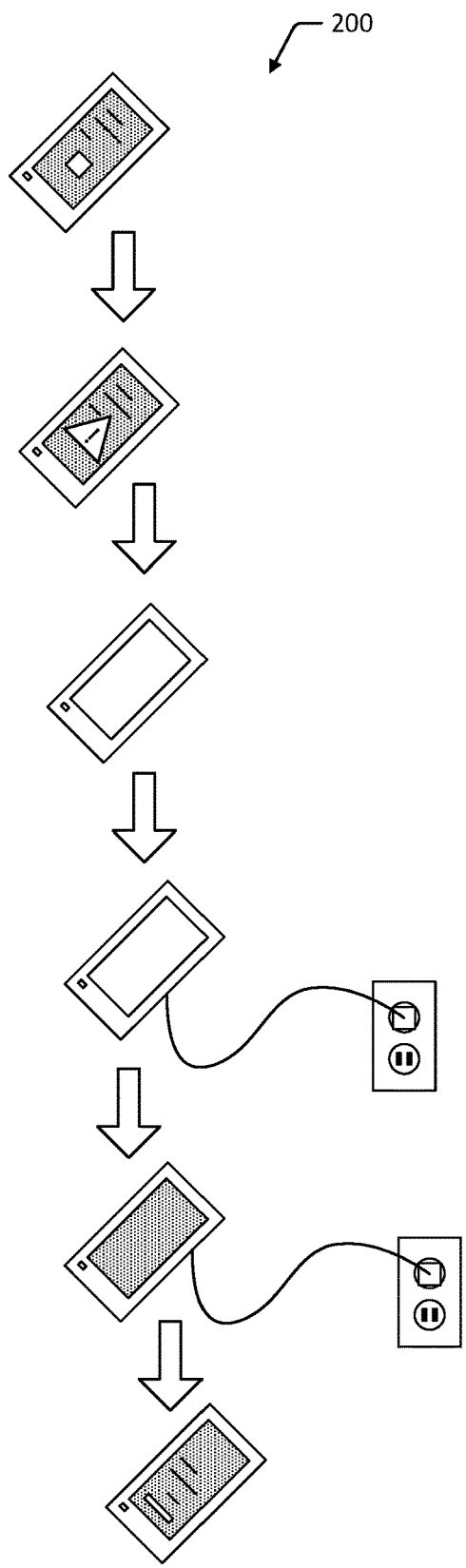

FIG. 2 illustrates a scenario 200 in which a fault in the electronic device 102 has been detected, the disconnect circuitry 108 has disconnected the battery 104 from the load in the electronic device 102, and operation is subsequently restored using external power such as from the external power source 150, according to some implementations.

At 202 the electronic device 102 is operated from battery power provided by a battery 104. For example, the electronic device 102 illustrated here is a tablet computer that may utilize a lithium polymer rechargeable battery. While a single battery 104 is described, it is understood that other types of power sources, or other combinations of power sources may be used. For example, the electronic device 102 may use a plurality of batteries 104, a wireless power receiver, and so forth, as a power source.

At 204 a fault condition is determined. For example, the PMIC 110 executes the disconnect control logic 112 that compares the operation data 138 to the threshold data 148. The fault condition may be determined when one or more conditions indicated by the operation data 138 exceed or fall below the specified threshold values indicated in the threshold data 148.

At 206 the disconnect circuitry 108 is operated to disconnect a negative terminal of the battery 104 from the load. For example, the PMIC 110 may release a pin that is connected to the disconnect circuitry 108, setting a gate voltage of a field effect transistor (FET) to a voltage that is above that FET's gate threshold value, allowing current to flow between the drain and the source of the FET. The disconnect circuitry 108 is discussed in more detail below with regard to FIG. 3.

At 208, the electonic device 102 is off, and external power is provided by an external power source 150. For example, the tablet may be plugged into a USB port on a computer, external charger, and so forth. The power from the external power source 150 may be provided to the positive load terminal Sys+ and the negative load terminal Sys−. In one implementation, the external power source 150 may comprise a second power source that is separate, such as a separate battery 104 in the electronic device 102. In another implementation, the external power source 150 may be omitted, and instead a separate circuit path may be provided to temporarily connect the battery 104 or other primary power source to the positive load terminal and the negative load terminal.

At 210 power is applied to the disconnect circuitry 108 to connect the negative terminal of the battery 104 to the load. For example, with the application of external power, the PMIC 110 may capture the pin, pulling the gate voltage of the FET down to below the gate threshold value, preventing current flow between the drain and the source of the FET. As a result, the battery 104 may be reconnected to the load.

At 212, operation of the electronic device 102 resumes. For example, the external power may be removed and the electronic device 102 may operate using power from the battery 104. If another fault condition is determined, the disconnect circuitry 108 may operate again to disconnect the battery 104 from the load.

Figure 3:
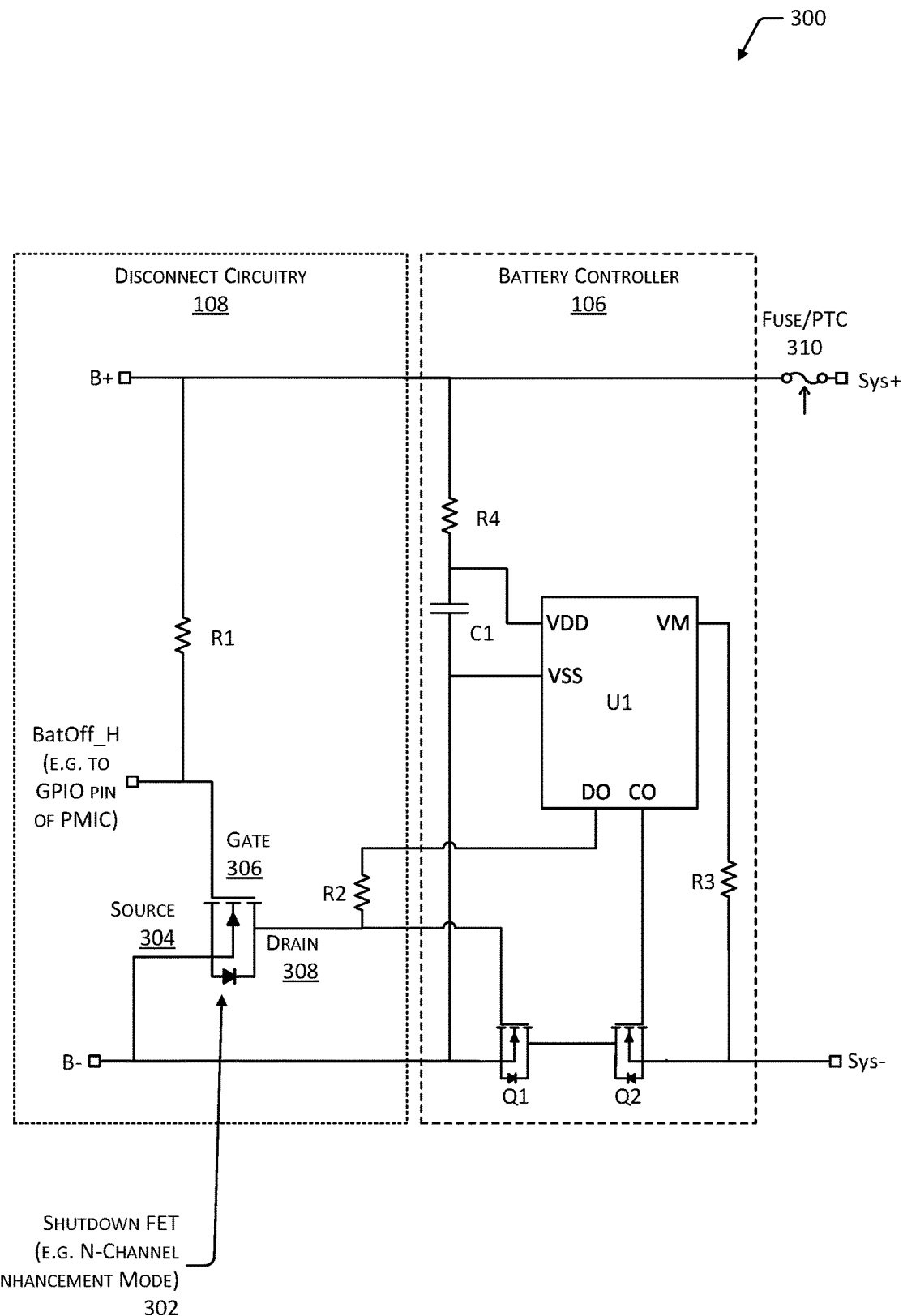
FIG. 3 depicts a circuit diagram of the disconnect circuitry, according to some implementations.

FIG. 3 depicts a circuit diagram 300 of the disconnect circuitry 108, according to some implementations. This diagram includes the battery controller 106 and the disconnect circuitry 108. For illustration, and not necessarily as a limitation, the battery controller 106 includes an integrated circuit U1 and power field effect transistors (FETs) Q1 and Q2. The battery controller 106 may consist of analog devices. For example, the battery 104 may comprise a single cell lithium polymer battery and the battery controller 106 may comprise the S-8211C series battery protection integrated circuit (IC) from SII Semiconductor Corporation. In other examples, other combinations of batteries 104 and battery controllers 106 may be used, with their associated circuitry. Additionally, while the power source discussed is a battery 104, the disconnect circuitry 108 may be used in conjunction with other types of power sources. In this diagram the load may be connected to the positive load terminal Sys+ and the negative load terminal Sys−. The PMIC 110 (not shown) may be part of the load, and is thus connected to the Sys+ and Sys− terminals.

The addition of the disconnect circuitry 108 does not affect operation of the battery controller 106. For example, the U1 IC continues to operate as designed, controlling charge and discharge of the battery 104. However, the disconnect circuitry 108 provides a mechanism to disconnect the battery 104 from the load.

The disconnect circuitry 108 comprises a shutdown FET 302. The shutdown FET 302 has three terminals: a source 304, a gate 306, and a drain 308. The FET may comprise an N-channel enhancement mode power FET. For example, the shutdown FET 302 may comprise the Q1 N-channel enhancement mode power FET that is part of the FDS4897C integrated circuit from On Semiconductor, Inc. With this type of FET, when the voltage at the gate 306, with respect to the source 304, is above a gate threshold value, the FET switches "on", allowing current to flow between the drain 308 and the source 304. During a non-fault condition, the gate 306 to source 304 voltage is kept below the gate threshold value, maintaining the FET in an "off" state, preventing current flow between the drain 308 and the source 304.

Other characteristics of the shutdown FET 302 may include a minimum electrostatic discharge (ESD) tolerance and a low leakage current. The guaranteed on voltage of the shutdown FET 302 may be lower than a lowest voltage needed for system operation.

The circuitry comprises a positive supply terminal and a negative supply terminal. For example, the positive supply terminal B+ may be connected to the positive terminal of a battery 104 (not shown). Continuing the example, the negative supply terminal B− may be connected to the negative terminal of the same battery 104 (not shown).

The source 304 of the shutdown FET 302 is connected to the negative supply terminal B−. The gate 306 of the shutdown FET 302 is connected to an input terminal that connects to a switchable component. The gate 306 also connects to a first resistor R1 and then, via resistor R1, to the positive supply terminal. For example, the input terminal is labeled "BatOff_H" and may be connected to an output terminal of the PMIC 110, such as a GPIO pin. At least a portion of the PM IC 110 may operate as a switchable component. The switchable component is controllable to provide a current path to the negative supply terminal B−.

In other implementations other devices may operate as the switchable component. For example, the switchable component may comprise a switch that is normally closed. In the event that a user wishes to activate the disconnect circuitry 108, the switch may be opened and the disconnect circuitry 108 operates to disconnect the power source from the load. In another example, the switchable component may comprise a voltage controlled resistor that transitions from a first resistance to a second resistance is that is less than the first resistance. The switchable component may exhibit at least a first state and a second state. The first state may be associated with a non-fault condition and the second state may be associated with a fault condition.

During a non-fault condition, the switchable component, such as the PMIC 110, maintains at the output terminal, a first voltage difference with respect to the negative supply terminal that is below a threshold level during normal operation. For example, during a non-fault condition, the GPIO pin is captured, and the voltage at the gate 306 is pulled down below the gate threshold for the shutdown FET 302. In the non-fault condition, the switchable component may provide a first impedance that allows for current flow between the output terminal and the negative supply terminal B–.

In the event of a fault condition, the pin may be released and the voltage at the gate 306 rises above the gate threshold value. For example, during inoperability of the PMIC 110 the output terminal may exhibit a second impedance that is greater than the first. The second impedance inhibits current flow between the output terminal and the negative supply terminal B–. As a result, a second voltage difference between the positive supply terminal B+ and the negative supply terminal B– is produced that is greater than or equal to the gate threshold voltage of the shutdown FET 302. The gate threshold voltage is the minimum voltage difference between a gate and source of a FET that produces conductance between the source and drain of the FET. This results in the shutdown FET 302 transitioning to an "on" state, in which a conductive path allows for current flow between the gate of Q1 and the source of Q1. As a result, the voltage difference between the gate and source of Q1 goes low, switching Q2 to an off state, in which current does not flow between the drain and source of Q1. This disconnects the battery 104 from the load.

Once the disconnect circuitry 108 has operated to turn Q1 to the off state, the circuitry of the electronic device 102 is unable to restore Q1 to the on state without the application of external power to the load or "Sys" side illustrated here. Upon application of power external to that provided via the disconnect circuitry 108 to the system or load side, as long as no fault exists, the shutdown FET 302 will resume an off state, allowing Q1 to resume an on state, connecting the battery 104 to the load.

The drain 308 of the shutdown FET 302 is connected to a gate of the Q1 FET. The source of the Q1 FET is connected to the negative supply terminal, B–.

In the configuration depicted, the gate of the Q1 FET is connected via resistor R2 to a discharge control terminal (DO) of U1. During normal operation, U1 may control the voltage to the gate of the Q1 FET to control discharge from the battery 104. As shown the drain of Q1 is connected to the source of Q2. The gate of Q2 is connected to a charge control terminal (CO) of U1. During normal operation, U1 may control the voltage to the gate of the Q2 FET to control charging of the battery 104.

Other connections may be provided to operate U1. For example, a voltage detection pin VM of U1 may be connected via resistor R3 to the source 304 of Q2. Continuing the example, an input pin for positive power supply (VDD) of U1 may be connected via resistor R4 to the positive supply terminal B+. An input pin for negative power supply (VSS) of U1 may be connected to the negative supply terminal B–. A capacitor C1 may be used to connect VSS and VDD.

In some implementations, the circuitry of the battery controller 106 and the disconnect circuitry 108 may be combined into a single integrated circuit. In other implementations, the circuitry may remain separate.

Other protective mechanisms may also be implemented in conjunction with the disconnect circuitry 108. For example, a fuse 310 may be placed in the Sys+ line. In other implementations the fuse 310 may be placed elsewhere. In one implementation, the fuse 310 may comprise an electrical conductor with specific properties that is designed to fail, such as by melting or vaporizing, in the event of an overcurrent condition resulting in an open circuit that prevents current flow. In another implementation, the fuse 310 may comprise a positive temperature coefficient (PTC) device. The PTC may include a material that undergoes a phase change when its temperature exceeds a threshold value. In the event of an overcurrent condition, the device heats up, the phase change takes place, which increases the resistance of the PTC thus inhibiting current flow. As the device cools, the resistance may decrease and current may again flow.

In contrast to the disconnect circuitry 108, the fuse 310 is a passive device. The response time of the fuse 310 may be greater than that of the disconnect circuitry 108. For example, some time needs to elapse in an overcurrent condition in order to heat the PTC such that the phase change which results in increased resistance takes place. In comparison, the disconnect circuitry 108 is able to operate in significantly less time. Additionally, in some situations a particular component in the load may be in an overcurrent condition, while the overall draw of the load as a whole is not. For example, the fuse 310 may be configured to operate at 8 amps, while a display component has a maximum safe current consumption of 1 amp. An overcurrent condition in the display component would not trigger operation of the fuse 310, but could result in the disconnect circuitry 108 operating to disconnect the batteries 104 from the load.

The circuitry is described herein with conductive pathways between terminals. It is understood that electrically equivalent pathways may also be used. For example, instead of two separate traces extending from the gate 306 to the discharge control terminal DO, a single trace may connect to the terminal of the gate 306, and then split into two traces, a one to the second resistor R2 and then the DO, and the other trace to the gate of Q1. Likewise, a portion of a printed circuit trace may connect the source 304 terminal to the negative supply terminal.

Figure 4A:
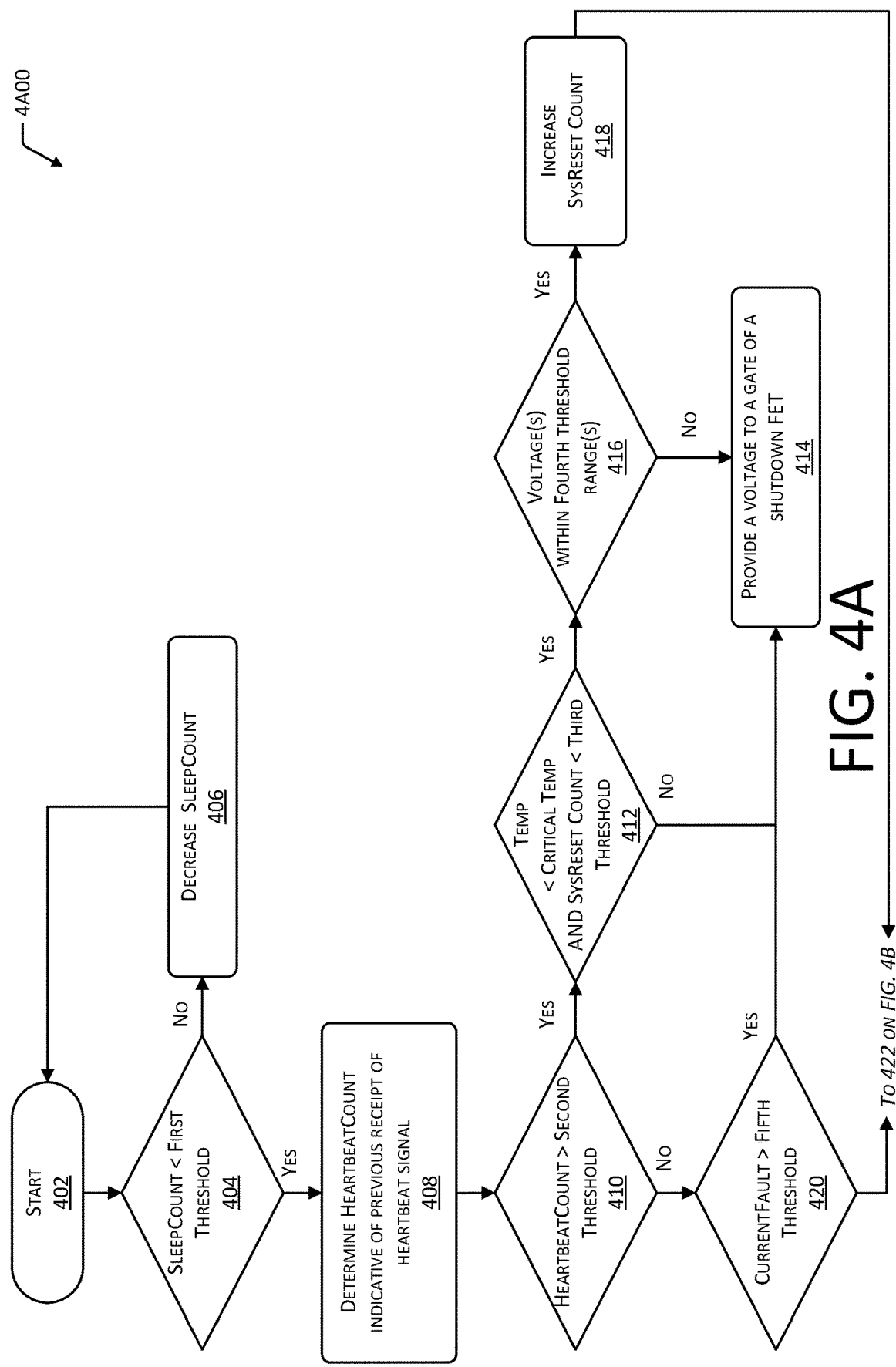
FIGS. 4A and 4B depict a flow diagram of a process to determine a fault in the electronic device, according to some implementations.
Figure 4B:
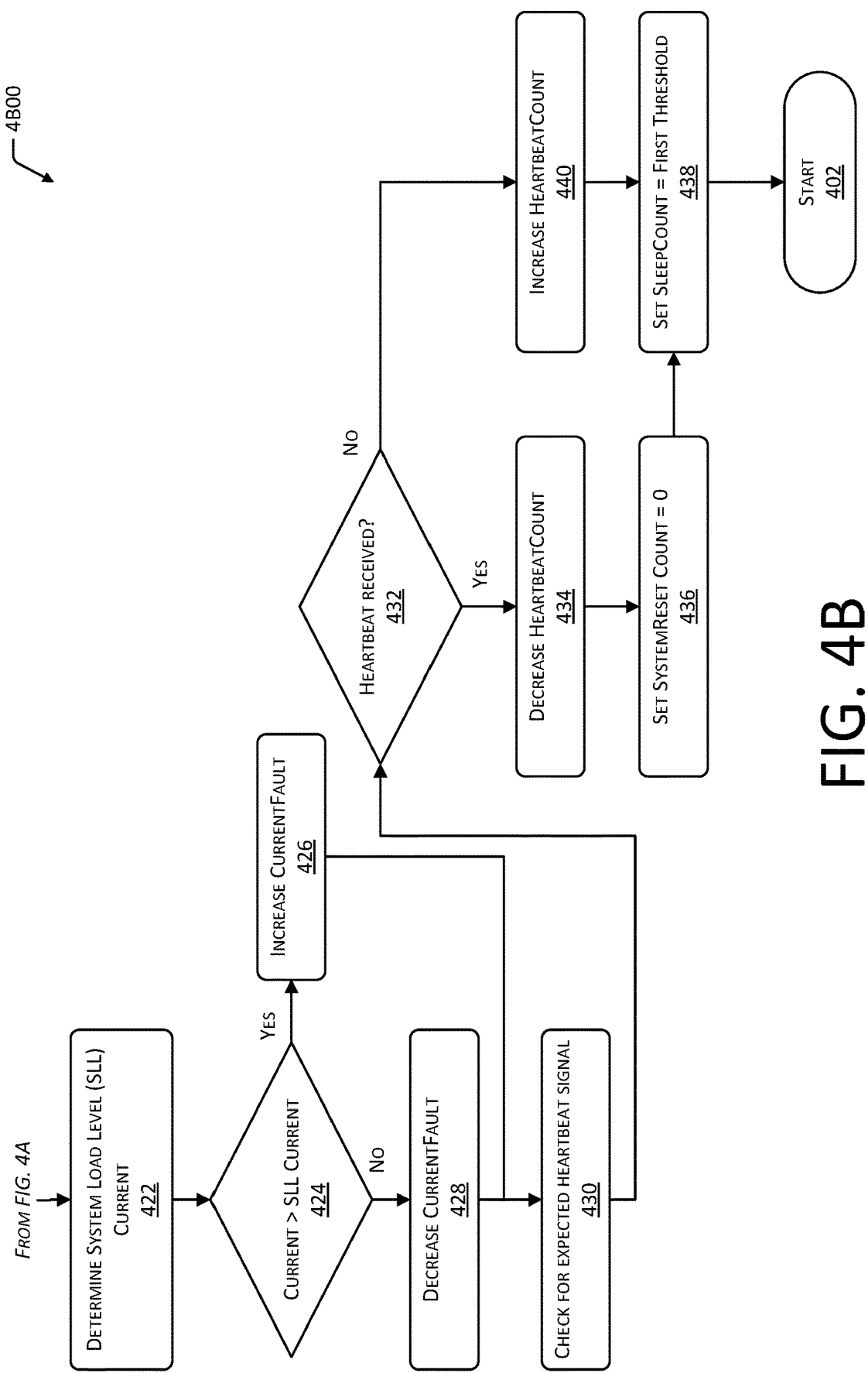

FIGS. 4A and 4B depict a flow diagram 400 of a process to determine a fault in the electronic device 102, according to some implementations. In some implementations the determination may be performed at least in part by one or more of the PMIC 110 or the processor 120. The process is depicted as a loop by way of illustration and not necessarily as a limitation. The process may be executed at regular intervals, at irregular intervals, on demand, responsive to an interrupt, and so forth. For example, the loop may operate at 30 second intervals. In another example, different portions of the process may operate at different intervals. For example, checks of temperature and voltage may be performed every 5 seconds, while other checks such as polling for heartbeat data, may take place every 30 seconds.

At 402 the process starts. At 404 a determination is made as to whether a SleepCount value is less than a first threshold. For example, when the electronic device 102 is transitioned to a low power mode, the SleepCount value may be set to a predetermined value. If the SleepCount value is not less than the first threshold, the process may proceed to 406. At 406, the SleepCount value is decreased, and the process proceeds back to 402. If the SleepCount value is less than the first threshold, the process may proceed to 408.

At 408, a HeartbeatCount is determined that is indicative of previous receipt of a heartbeat signal. During operation, components of the electronic device 102 may provide a heartbeat to the PMIC 110. For example, the processor 120 may provide a heartbeat signal to the PMIC 110 indicating that the processor 120 is operating.

At 410 a determination is made as to whether the HeartbeatCount is greater than a second threshold. If the HeartbeatCount is greater than the second threshold, the system proceeds to 412.

At 412 a determination is made as to whether a temperature value indicative of a temperature of one or more components of the electronic device 102 is less than a critical temperature value. Also determined is if a SysReset count is less than a third threshold. For example, the SysReset count may be set to a predetermined non-zero value during boot, another reset, or restart of the electronic device 102. If one or both of the determinations is no, the process proceeds to 414.

At 414 a voltage is provided to the gate 306 of the shutdown FET 302 that is greater than or equal to the gate threshold voltage. This voltage results in transitioning the shutdown FET 302 from an off state to an on state. For example, the PMIC 110 may release a GPIO pin that is connected to the gate 306 of the shutdown FET 302. As a result of the release, the voltage at the gate 306 increases. In other implementations the PMIC 110 may affirmatively provide a voltage that is above the gate threshold value to the gate 306.

Returning to 412, if the temperature value is less than the critical temperature value and the SysReset count is less than the third threshold, the process proceeds to 416. At 416 one or more of the voltages associated with operation of the electronic device 102 are assessed to make sure they are within respective threshold ranges. For example, the main supply rail voltage may be determined and compared to a minimum voltage value and a maximum voltage value specified by the threshold data 148. Continuing the example, if the main supply rail voltage is 3.2 V and the acceptable range is 3.1 V to 3.5 V, the process may proceed to 418.

At 418 the SysReset count is increased and the process proceeds to 422. For example, the SysReset count may be increased by +1. Returning to 416, if the one or more voltages are not within the respective threshold ranges, the process proceeds to 414.

Returning to 410, if the HeartbeatCount not greater than the second threshold, the process may proceed to 420. At 420 a determination is made as to whether a CurrentFault counter is greater than a fifth threshold. The CurrentFault counter may be increased as described below in the event current draw exceeds a threshold value. If the CurrentFault counter is greater than the fifth threshold, the process proceeds to 414. For example, this situation may result from several different occurrences of one or more components of the electronic device 102 experiencing excessive current consumption. If not, the process proceeds to 422.

At 422 a system load level (SLL) current is determined. The SLL current may be determined based at least in part on the component status 146. For example, the component status 146 may indicate the operating state, such as off, standby, active low, active medium, active high, and so forth. Based on this component status 146, data may be retrieved that indicates for each of these components in their respective states, what the expected current consumption would be. These expected current consumption values may be summed to determine the SLL current.

At 424 a determination is made as to whether the system current 140 is greater than the SLL current. For example, the operation data 138 may include system current 140 provided by the main regulator 114 that indicates the actual total current draw at a given time. This is then compared with the SLL current that is indicative of what the expected total current draw should be. If the system current 140 is greater than the SLL current, the process proceeds to 426. At 426 the CurrentFault counter is increased. For example, the CurrentFault counter may be increased by +1. The process may then proceed to 430.

In other implementations the comparison of 424 may be made for selective components. For example, the expected current draw for a display may be compared to the actual component current 142 for that display.

Returning to 424, if the determination is that the system current 140 is not greater than the SLL current, the process may proceed to 428. At 428 the CurrentFault counter is decreased. For example, the CurrentFault counter may be decreased by −2. The magnitude of the increase and decrease may be asymmetric as described herein. Such asymmetry allows the disconnect control logic 112 to more quickly return to a non-fault state and acts to debounce operation of the device.

The process may then proceed to 430. At 430 a check is made for an expected heartbeat signal. At 432 a determination is made as to whether a heartbeat signal has been received. If a heartbeat signal is received, the process may proceed to 434. At 434 the HeartbeatCount is decreased. For example, the HeartbeatCount may be decreased by −2. The HeartbeatCount may be configured to have a minimum value of 0. The process then proceeds to 436. At 436, the SystemReset Count is set to a predetermined value, such as 0. The process then proceeds to 438.

At 438 the SleepCount value is set to the first threshold value. For example, the SleepCount value may be set to the pre-determined value. The process may then proceed to 402.

Returning to 432, if no heartbeat signal is received, the process proceeds to 440. At 440 the HeartbeatCount is increased. For example, the HeartbeatCount may be increased by +1. The process then proceeds to 438.

After proceeding to 402, the process may subsequently occur again.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Specific physical embodiments as described in this disclosure are provided by way of illustration and not necessarily as a limitation. Those having ordinary skill in the art readily recognize that alternative implementations, variations, and so forth may also be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features, structures, and acts are disclosed as exemplary forms of implementing the claims.

What is claimed is:

1. A device comprising:
a battery having a positive battery terminal and a negative battery terminal;
a battery controller comprising an integrated circuit to control charge and discharge of the battery;
a power management integrated circuit (PMIC);
one or more components that present a load;
a first field-effect transistor (FET) comprising:
a first source terminal that is connected to the negative battery terminal;
a first gate terminal that is connected to the positive battery terminal via a first resistor and an output of the PMIC; and
a first drain terminal that is connected to a discharge control terminal of the battery controller via a second resistor and a second gate terminal of a second FET;
the second FET further comprising:
a second source terminal connected to the negative battery terminal;
the second gate terminal that is connected to the discharge control terminal of the battery controller via the second resistor and the first drain terminal; and
a second drain terminal that is connected to a third drain terminal of a third FET;
the third FET further comprising:
a third source terminal that is connected to a voltage detection terminal of the battery controller via a third resistor and a negative load terminal;
a third gate terminal that is connected to a charge control terminal of the battery controller; and
the third drain terminal is connected to the second drain terminal;
the battery controller further comprising:
a positive input terminal connected to the positive battery terminal via a fourth resistor; and
a negative input terminal that is connected to the positive battery terminal via a first capacitor and the fourth resistor and the negative battery terminal; and
the PMIC executing instructions to:
determine a fault condition; and
set the output of the PMIC to a first voltage such that a voltage across the first gate terminal and the first source terminal is above a gate threshold value of the first FET and causes the first FET to transition to an on state in which current flows between the first drain terminal and the first source terminal.

2. The device of claim 1, the PMIC further executing instructions to:
access operation data comprising one or more of:
system current data indicative of current draw at a particular time by the load;
component current data indicative of current draw at a particular time by individual ones of the one or more components;
system voltage data indicative of a voltage across a main bus; or
component status data indicative of operation of individual ones of the one or more components;
determine, based on the operation data, one or more predetermined thresholds that are indicative of normal operation of the individual ones of the one or more components have been exceeded; and
generate data indicative of the fault condition.

3. A device comprising:
a positive supply terminal and a negative supply terminal;
a first field-effect transistor (FET) comprising:
a first source terminal,
a first gate terminal, and
a first drain terminal; and
a second FET comprising:
a second source terminal that is connected to the negative supply terminal;
a second gate terminal that is connected to the positive supply terminal via a first resistor and is also connected to an output terminal of a power management integrated circuit (PMIC); and
a second drain terminal that is connected to the first gate terminal.

4. The device of claim 3, further comprising:
a third FET comprising:
a third source terminal connected to a negative load terminal,
a third gate terminal, and
a third drain terminal connected to the first drain terminal; and
a positive load terminal connected to the positive supply terminal.

5. The device of claim 4, further comprising:
a battery controller comprising:
a discharge control terminal connected via a second resistor to the first gate terminal, and
a charge control terminal connected to the third gate terminal.

6. The device of claim 3, wherein at least a portion of the PMIC operates as a switch.

7. The device of claim 3, wherein the output terminal of the PMIC is a general purpose input/output (GPIO) pin.

8. The device of claim 3, wherein:
the PMIC while in a first state provides a first impedance to a current path between the output terminal of the PMIC and the negative supply terminal such that the current path maintains a first voltage difference between the positive supply terminal and the negative supply terminal that is below a gate threshold voltage of the second FET; and
the PMIC while in a second state provides a second impedance that is greater than the first impedance that results in a second voltage difference between the positive supply terminal and the negative supply terminal that is greater than or equal to the gate threshold voltage of the second FET.

9. The device of claim 3, wherein:
the PMIC is further configured to:
compare operation data indicative of operation of a component of the device with a threshold;
determine, based on the comparison, a fault condition; and set the output terminal of the PMIC to a voltage that is greater than or equal to a gate threshold voltage of the second FET.

10. A method of operating a device comprising:
   determining a fault condition in the device based on a comparison of operation data and one or more threshold values;
   providing a first voltage at a first gate terminal of a first field-effect transistor (FET) that exceeds a first gate threshold of the first FET, wherein the first gate terminal is connected to a positive supply terminal;
   responsive to the providing the first voltage, transitioning the first FET to an on state that allows a first flow of current between a second gate terminal of a second FET and a negative supply terminal, wherein a second source terminal of the second FET is connected to the negative supply terminal;
   responsive to the first flow of current between the second gate terminal and the second source terminal, providing a second voltage that is less than a second gate threshold of the second FET; and
   responsive to the second voltage, transitioning the second FET to an off state that inhibits a second flow of current between a second drain terminal of the second FET and the second source terminal.

11. The method of claim 10, further comprising:
   transitioning a component from a first impedance that allows a third flow of current between the first gate terminal and a ground to a second impedance that is greater than the first impedance, wherein the second impedance reduces the third flow of current to below a threshold value.

12. The method of claim 10, further comprising:
   operating a component to allow a third flow of current between the first gate terminal and the positive supply terminal.

13. The method of claim 10, further comprising:
   providing the first voltage at the first gate terminal responsive to the determining the fault condition in the device.

14. The method of claim 13, further comprising:
   determining the operation data comprising one or more of:
      system current data indicative of current draw at a particular time by a load,
      component current data indicative of current draw at a particular time by a component,
      system voltage data indicative of a voltage across a main bus,
      component status data indicative of operation of the component,
      heartbeat count indicative of receipt of a heartbeat signal from the component, or
      system reset data indicative of a reset of the device; and
   the determining the fault condition comprising determining that the operation data exceeds the one or more threshold values.

15. The method of claim 13, wherein determining the fault condition comprises:
   determining a temperature of a component of the device; and
   determining that the temperature is greater than a temperature threshold value.

16. The method of claim 13, wherein determining the fault condition comprises:
   determining a voltage at a component of the device; and
   determining that the voltage is greater than or less than one or more voltage threshold values.

17. The method of claim 13, wherein determining the fault condition comprises:
   determining current consumption of at least a portion of the device; and
   determining that the current consumption is greater than or less than one or more current threshold values.

18. The method of claim 13, the determining the fault condition comprising:
   determining a heartbeat count that is indicative of receipt of a heartbeat signal from a component of the device exceeds a threshold value;
   determining a temperature of the component of the device is less than a temperature threshold value; and
   determining a voltage at the component of the device is either less than a first threshold value or greater than a second threshold value.

19. The method of claim 13, the determining the fault condition comprising:
   determining, using a power management integrated circuit (PMIC), that the operation data about a component of the device is one or more of greater than a first threshold value or less than a second threshold value; and
   operating the PMIC to provide the first voltage at the first gate terminal.

20. The method of claim 10, further comprising:
   providing a third voltage across the positive supply terminal and the second drain terminal of the second FET; and
   responsive to the providing the third voltage, transitioning the first FET to an off state that inhibits the first flow of current.

* * * * *